(12) United States Patent
Lundgren et al.

(10) Patent No.: US 7,673,833 B2
(45) Date of Patent: Mar. 9, 2010

(54) PROTECTIVE SHIELD ASSEMBLY FOR SPACE OPTICS AND ASSOCIATED METHODS

(75) Inventors: Mark Andrew Lundgren, Fullerton, CA (US); Henry K. Shu, Laguna Niguel, CA (US); Carl Frederick Dadson, Laguna Niguel, CA (US)

(73) Assignee: The Boeing Company, Chicago, IL (US)

( * ) Notice: Subject to any disclaimer, the term of this patent is extended or adjusted under 35 U.S.C. 154(b) by 2 days.

(21) Appl. No.: 12/137,974

(22) Filed: Jun. 12, 2008

(65) Prior Publication Data
US 2009/0032647 A1 Feb. 5, 2009

Related U.S. Application Data

(62) Division of application No. 10/940,842, filed on Sep. 14, 2004, now Pat. No. 7,401,752.

(51) Int. Cl.
*B64G 1/52* (2006.01)
(52) U.S. Cl. .................... 244/171.7; 244/173.1
(58) Field of Classification Search .......... 244/171.7, 244/171.8, 173.1, 158.9, 121
See application file for complete search history.

(56) References Cited

U.S. PATENT DOCUMENTS

| | | | |
|---|---|---|---|
| 3,416,750 A | 12/1968 | Young | |
| 4,085,910 A | 4/1978 | Baker et al. | |
| 4,151,800 A | 5/1979 | Dotts et al. | |
| 4,598,884 A | 7/1986 | Speer | |
| 4,770,374 A | 9/1988 | Regipa | |
| 4,850,275 A | 7/1989 | Utreja et al. | |
| 4,947,174 A | 8/1990 | Lehman et al. | |
| 5,568,902 A | 10/1996 | Hurley, Jr. | |
| 6,332,029 B1 | 12/2001 | Azima et al. | |
| 6,439,048 B1 | 8/2002 | Hui et al. | |
| 6,647,855 B1 | 11/2003 | Christiansen et al. | |
| 6,914,022 B2 | 7/2005 | Bell, III et al. | |

*Primary Examiner*—Timothy D Collins
(74) *Attorney, Agent, or Firm*—Alston & Bird LLP

(57) ABSTRACT

A protective shield assembly capable of being deployed from a launch vehicle is provided, and methods for assembling and deploying the protective shield assembly are also provided. The protective shield assembly includes a shroud, and a flexible sheet of material within the shroud. The flexible sheet of material is capable of substantially conforming to a contour of at least a portion of the launch vehicle to provide a protective barrier.

17 Claims, 5 Drawing Sheets

PROTECTIVE SHIELD ASSEMBLY FOR SPACE OPTICS AND ASSOCIATED METHODS

CROSS-REFERENCE TO RELATED APPLICATIONS

The present application is a divisional of U.S. application Ser. No. 10/940,842, filed Sep. 14, 2004, which is hereby incorporated herein in its entirety by reference.

BACKGROUND OF THE INVENTION

1) Field of the Invention

The present invention relates to a shield for space optics and, more particularly, to a shield for protecting space optics from heat and contamination.

2) Description of Related Art

Interceptors, such as missiles or rockets for air defense, use various techniques for in-flight guidance in order to identify and/or engage airborne objects. If the interceptor is searching for a ballistic missile, the interceptor must not only be capable of tracking the missile but also distinguishing between the missile and any decoys. Examples of in-flight guidance techniques include devices, technologies, and media using infrared or visible cameras or detectors, LADAR, transducers, or other sensors, including sensitive components such as lenses, mirrors, lasers, or fiber optics, to transmit or detect light, other electromagnetic energy such as millimeter waves, or other forms of energy, such as sound waves.

Interceptors that employ optical systems for targeting include optics and electronics that are susceptible to overheating and contamination. In particular, during launch and at high speeds, the interceptor is subjected to frictional heating from air passing at high speeds over the interceptor causing increased temperatures that re-radiate to the optical surfaces and electronic assemblies. In addition, vibration caused during launch and flight frees particulate contamination from the interior of the interceptor that may re-deposit on the optical surfaces. As a result of the heat and contamination, the optical system will provide a lower signal-to-noise ratio due to obscuration from contaminants, increased infrared background from contamination and heating, and blurring due to warping of the optics from heating.

Different techniques have been developed to protect the optical system while airborne. One technique is to use a cover or group of covers that are positioned proximate to the nose of the interceptor and over the optical system while the interceptor is airborne. The cover(s) are later pivoted, ejected, or otherwise moved with mechanical devices to allow the optical system to operate. However, this system cannot provide protection from heat and contamination proximate to the cover itself and its deployment.

Another technique for protecting the optical system is a shroud that is disclosed in conjunction with an aircraft, where the shroud typically conforms to the nose of the aircraft and may later be deployed and, therefore, removed once the aircraft reaches a designated speed. U.S. Pat. No. 4,850,275 to Utreja et al. discloses a shroud positioned fore of a hollow nose portion that may be removed once the aircraft reaches a designated speed. The nose portion includes an optical window positioned aft of the shroud such that when the shroud is removed, the optical window is revealed. The shroud is designed to be detached automatically from the nose portion once the airplane obtains a desired altitude and/or speed. Within the nose portion, a nose cavity includes a base annularly surrounded by a rim. The optical window is integral to the base of the nose cavity, where the base is formed deep within the cavity to minimize convective heat flow along the base portion and conductive heat flow along the rim and cavity walls. The cavity of the nose portion is configured to lower the heat transfer coefficient and the unsteady density fluctuations about the optical window. However, there is no protective shield between the shroud and the optical window such that the optical window is still susceptible to heat radiation and contamination traveling from the interior of the shroud and through the nose cavity, which increases the probability for blurring of the optical system. In other words, while the shroud protects the optical window and the optical system that communicates through the optical window from external communication, the optical window is not protected from contamination originating from the shroud itself.

It would therefore be advantageous to provide a protective shield that is capable of protecting systems disposed within a launch vehicle, such as from heat and contaminants. It would also be advantageous to provide a protective shield that is capable of being deployed from the launch vehicle with a shroud. It would further be advantageous to provide a protective shield that is inexpensive and easily removed when deployed.

BRIEF SUMMARY OF THE INVENTION

The invention addresses the above needs and achieves other advantages by providing a protective shield assembly that is capable of protecting launch vehicle components, such as an optical system, and thereafter further capable of being deployed and, therefore, removed from a launch vehicle, such as a missile. The protective shield assembly includes a shroud and a flexible sheet of material within the shroud that is capable of conforming to the contour of a portion of the launch vehicle that may be susceptible to heat and contaminants. Thus, while the shroud protects the launch vehicle components from external contaminants, the flexible sheet of material protects the launch vehicle components from contaminants originating within the shroud and launch vehicle, as well as heat. When the shroud is deployed, the flexible sheet of material is also advantageously pulled away from the launch vehicle to expose a portion of the launch vehicle, which is typically an optical system, thereby exposing the optical system for operation.

In one embodiment of the present invention, a protective shield assembly capable of being deployed from a launch vehicle is provided. The protective shield assembly includes a shroud, and a flexible sheet of material within the shroud. In one embodiment, the flexible sheet of material may be a thermally insulating material, which could be a multilayer insulation material such as a polyester film. The polyester film may include a reflective metallic coating such as gold or aluminum. As such, the flexible sheet of material may provide a thermal barrier. The flexible sheet of material is capable of substantially conforming to a contour of at least a portion of the launch vehicle to provide a protective barrier. In one embodiment of the present invention, the flexible sheet of material attaches circumferentially to the shroud to define a pocket between the shroud and the flexible sheet of material. In addition, the shroud may include a plurality of segments, and the flexible sheet of material may include a plurality of sheets of material, where each sheet of material may attach to a respective segment.

In addition, the present invention provides a system for deploying a protective shield assembly from a launch vehicle. The system includes a launch vehicle and a protective shield assembly attached to the launch vehicle, where the protective shield assembly was described above. In various embodiments of the system, the launch vehicle is a missile including an optical system disposed within the missile, and the flexible sheet of material typically conforms to a contour of the optical system and is capable of providing a protective barrier for the optical system from heat and contaminants. In addition, the flexible sheet of material may define at least one fold between the shroud and the optical system, where the fold is capable of substantially conforming circumferentially about the optical system.

A further protective shield assembly is provided in accordance with the present invention, where the protective shield assembly is capable of being attached to a shroud. The protective shield assembly includes a flexible sheet of material having a covering portion, at least one folding portion, and an attachment portion. The protective shield assembly also includes a tie, such as a ring positioned about the circumference of the shroud or rivets, that is capable of attaching the attachment portion to the shroud.

The present invention also provides a method for assembling a protective shield assembly on a launch vehicle. The method includes providing a shroud having a flexible sheet of material therewithin, such as by being attached to the shroud. In various aspects of the method, the method includes attaching the flexible sheet of material circumferentially to the shroud to define a pocket between the shroud and the flexible sheet of material. The method also includes connecting the shroud to a first end of the launch vehicle such that the flexible sheet of material substantially conforms to a contour of at least a portion of the launch vehicle, such as an optical system, to provide a protective barrier, such as from heat and contaminants. In connecting the shroud to a first end of the launch vehicle, the flexible sheet of material may define at least one fold between the shroud and the optical system, where the fold is capable of substantially conforming circumferentially about the optical system.

The present invention provides an additional method for deploying a protective shield assembly from a launch vehicle. The method includes providing a launch vehicle having a shroud with a flexible sheet of material therewithin such that the flexible sheet of material substantially conforms to a contour of at least a portion of the launch vehicle to provide a protective barrier. The method further includes deploying the shroud from the launch vehicle such that the flexible sheet of material is removed from the launch vehicle. For example, the shroud may be deployed from the launch vehicle to remove the flexible sheet of material such that an optical system disposed within the launch vehicle is exposed. In addition, the method may also include igniting an explosive device to release the shroud and the flexible sheet of material from the launch vehicle.

The present invention therefore provides many advantages. The flexible sheet of material provides a protective layer that may conform about an optical system disposed within a launch vehicle, such as a missile. Providing a flexible sheet of material enables the material to be configured about a variety of launch vehicle components to provide a barrier against heat and contaminants that may otherwise sacrifice the accuracy of the components, such as an optical system. Thus, the incidence of a lower signal-to-noise ratio and blurring due to warped optics may be significantly reduced.

Furthermore, the flexible sheet of material may be an inexpensive material, such as a polyester film, and may be readily attached to the interior surface of the shroud. Upon deployment of the shroud, the flexible sheet of material is also removed from the launch vehicle, which provides additional protection for the launch vehicle components without affecting the ability of shroud to be deployed from the launch vehicle. Finally, because the flexible sheet of material has a broad area of attachment substantially about the circumference of the shroud, the risk of failure during deployment is greatly reduced when compared with mechanical devices having a single or very few areas of attachment and/or including techniques that have a higher risk of failure during deployment of the shroud.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
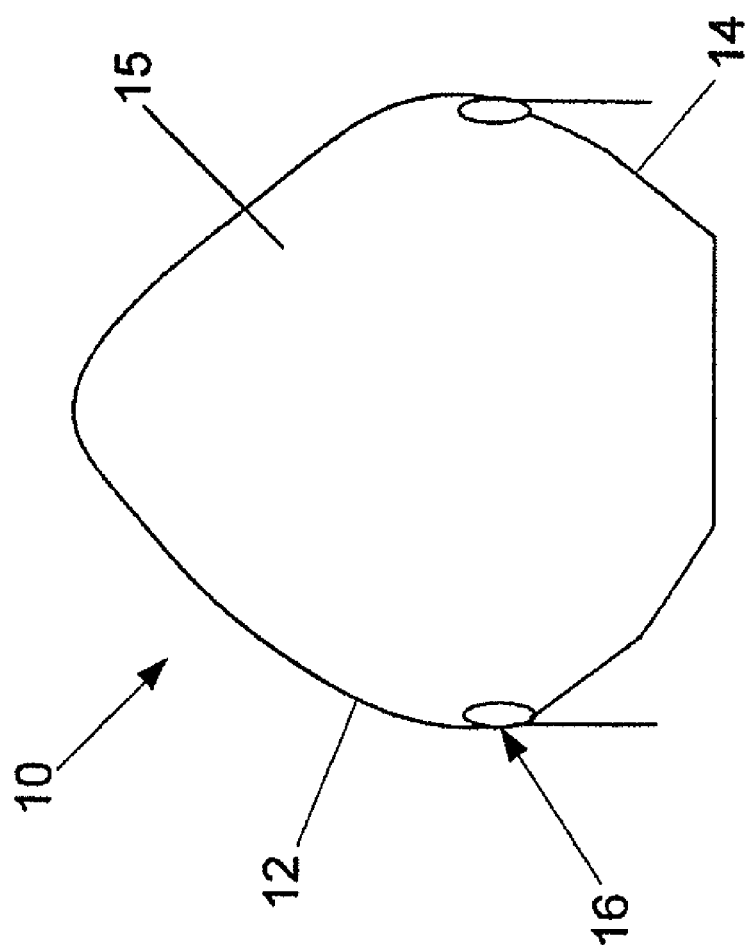
FIG. 1 is a cross-sectional view of a protective shield assembly according to one embodiment of the present invention.

Referring now to the drawings and, in particular to FIG. 1 there is shown a protective shield assembly 10. The protective shield assembly 10 generally includes a shroud 12 and a flexible sheet of material 14 attached to an interior surface of the shroud. In general, the protective shield assembly 10 is employed to protect launch vehicle components, such as an optical system, that are disposed within the launch vehicle but later exposed when the assembly is deployed and removed from the launch vehicle. However, it is understood that the protective shield assembly 10 may remain attached to a launch vehicle despite having the capability to be deployed from the launch vehicle, such as in instances where additional protection is required for accurate operation of the launch vehicle components.

As used herein, the term "launch vehicle" is not meant to be limiting, as the protective shield assembly 10 may be employed with any launch vehicle. For example, the launch vehicle could be any type of missile, having an interceptor or payload, an aircraft, a satellite, or other airborne vehicle having sensitive components contained therein.

Furthermore, as used herein, the term "shroud" is not meant to be limiting and is known to those skilled in the art to include a protective covering that is typically attached to a leading end of a missile. The shroud, also known as a fairing, could be employed with a missile or rocket, such as an interceptor, or a ballistic missile having a payload, or any number of types of launch vehicles, as described above. The shroud is typically configured as a nose cone to reduce air resistance and drag during take off and while airborne. The shroud also protects various launch vehicle components, where the components could be a guidance system, satellite, optical system, or payload, from external aerodynamic loads, vibration, noise, temperature extremes, contaminants, and other environments that may be encountered as the vehicle is launched and accelerates through the atmosphere. The shroud also serves as a protective shield for the launch vehicle components while the launch vehicle is in storage. The shroud is typically deployed and removed or expelled from the launch vehicle once the launch vehicle reaches a predetermined speed or location. The shroud could be any size and configuration for various types of launch vehicles, and the shroud may be, for example, a metallic or composite material, such as aluminum, graphite-epoxy, or wood.

The flexible sheet of material 14 is a semi-flexible material that is attached to an inner surface of the shroud 12 to define a pocket 15 between the shroud and the sheet of material. Thus, any contaminants that have adhered to the inner surface of the shroud 12 that could come loose will be captured or retained within the pocket 15. When the protective shield assembly 10 is deployed from a launch vehicle, both the shroud 12 and the sheet of material 14 will be disengaged such that the contaminants within the pocket 15 will be removed. The sheet of material 14 is typically a thin sheet attached near the base of the shroud 12 about the entire circumference of the shroud to define the pocket 15, although the sheet of material could be substantially attached at various points about the circumference of the shroud. In addition, it is understood that the sheet of material 14 may be attached at various positions within the shroud 12 in further embodiments of the present invention to accommodate various launch vehicle components. For instance, the sheet of material 14 could be attached proximate to the base of the shroud 12 adjacent to the launch vehicle, or the sheet of material could be attached further towards the nose of the shroud.

Figure 4C:
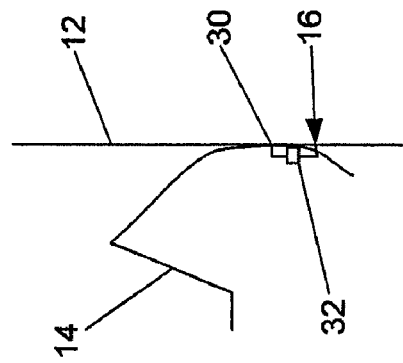
FIG. 4C is a partial cross-sectional view of a protective shield assembly illustrating a tie according to yet another embodiment of the present invention.
Figure 4B:
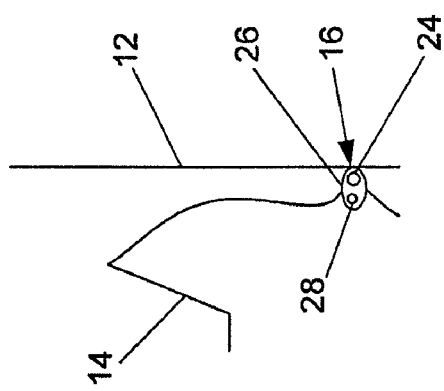
FIG. 4B is a partial cross-sectional view of a protective shield assembly illustrating a tie according to another embodiment of the present invention.
Figure 4A:
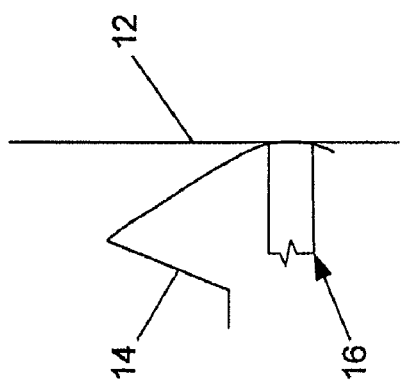
FIG. 4A is a partial cross-sectional view of a protective shield assembly illustrating a tie according to one embodiment of the present invention.

The flexible sheet of material 14 could be attached with a tie 16 about the circumference of the shroud 12. FIG. 4A illustrates a tie 16 positioned adjacent to, and circumferentially about, the shroud 12, where an attachment portion of the sheet of material 14 extends between the tie and the shroud such that the tie secures the sheet of material against the shroud. Thus, the tie 16 in this particular embodiment, may be, for example, a snap ring or similar device that applies an outward force circumferentially about the shroud 12 that secures or pinches an attachment portion of the sheet of material 14 in position. Furthermore, the tie 16 could include a ring 24 attached to the inner surface of the shroud 12, where a plurality of clips 26 engage the ring, and an attachment portion of the sheet of material 14 includes a series of grommets 26 or eyelets that engage a respective ring, such as that shown in FIG. 4B. In addition, FIG. 4C demonstrates that the tie 16 could include a bracket 30 attached to an inner surface of the shroud 12, and a plurality of rivets 32 may be inserted through an attachment portion the sheet of material 14 and into the bracket about a circumference of the shroud. Similarly, rivets 32 could be inserted through the sheet of material 14 and directly into the shroud 12 such that the bracket is not required. The attachment portion of the sheet of material 14 is typically located proximate to a perimeter of the sheet of material, although the attachment portion could be positioned anywhere on the sheet of material and still be capable of attaching to the shroud 12.

The attachment technique used facilitates the sheet of material 14 being ejected with the shroud 12 such that the sheet of material is removed when the shroud is deployed from a launch vehicle. As such, the sheet of material 14 may be removed as a single unit with the shroud 12 as the entire protective shield assembly 10 is deployed from a launch vehicle. Moreover, attaching the sheet of material 14 substantially about the circumference of the shroud 12 provides a lower risk of failure when removing the sheet, as several locations are required to fail before the sheet of flexible material detaches from the shroud and is no longer removed with the shroud. Although the sheet of material 14 is shown attached to the shroud 12, it is understood that the flexible sheet of material could be integral with the shroud such that no attachment techniques are required.

The flexible sheet of material 14 is typically a lightweight and thermally insulating material, such as multilayer insulation (MLI) material that is capable of insulating and protecting an optical system 18 from heat and contaminants. In one embodiment of the present invention, the sheet of material 14 includes a smooth cleanable surface, where the clean smooth surface faces, and may contact, the optical system 18 to prevent any contaminants from depositing on the optical system. The sheet of material 14 could also be a non-shedding or low-outgassing material (i.e., a cleanroom material). The sheet of material 14 includes materials that are pliable and capable of being shaped and conformed in a variety of configurations. For example, as shown in FIG. 2A, the sheet of material 14 includes a covering portion that is configured to substantially conform to the size and shape of the optical system 18. Being able to closely conform to the shape of the optical system enables the sheet of material 14 to protect the optical system 18 from contaminants that may break loose from the shroud 12 or launch vehicle by vibrations during flight or during storage and redeposit on the optical system. Thus, the covering portion of the sheet of material 14 is capable of providing a shield and/or conforming to a variety of launch vehicle components in various embodiments of the present invention.

Examples of MLI materials suitable for the flexible sheet of material 14 in accordance with the present invention are polyester or Mylar® (E.I. Du Pont de Nemours and Company Corporation) films that preferably include a thin reflective coating such as aluminum or gold. Other acceptable MLI materials that are clean and electro-static safe are those manufactured by Sheldahl Corp. (Northfield, Minn.) and Swales Aerospace (Beltsville, Md.). The coating is used to reflect infrared radiation to protect the optics from heat that may adversely affect the sensitive optical and electronic components within the launch vehicle. In one embodiment, the sheet of material 14 is 0.001 inches in thickness, although the sheet of material could be various thicknesses in alternative embodiments.

As depicted in FIG. 2A, the flexible sheet of material 14 may include one or more folding portions or pleats 20. A portion of the sheet of material 14 extends longitudinally along and circumferentially about the optical system 18, or at least the forward most portion of the optical system, and forms at least one fold between the optical system and the shroud 12. In this configuration, the pocket 15 and folding portions 20 prevent contaminants from migrating from the interior of the shroud 12, as shown by arrow 21a in FIG. 2A, and the launch vehicle, as shown by arrow 21b, and then redepositing on the optical system. Particularly, the folding portions 20 extend substantially along the longitudinal axis of the optical system 18 to prevent contaminants originating from the launch vehicle from contacting the optical system or even contacting the sheet of material 14 within the pocket 15 adjacent to the optical system. Moreover, the folding portions 40 may trap hot expanding air and thermal radiation between the shroud 12 and the sheet of material 14, which protects the optical system 18 from excessive heat. Although the sheet of material 14 is shown having two folds, it is understood that there may be any number and configuration of folds in additional embodiments of the present invention.

Figure 5:
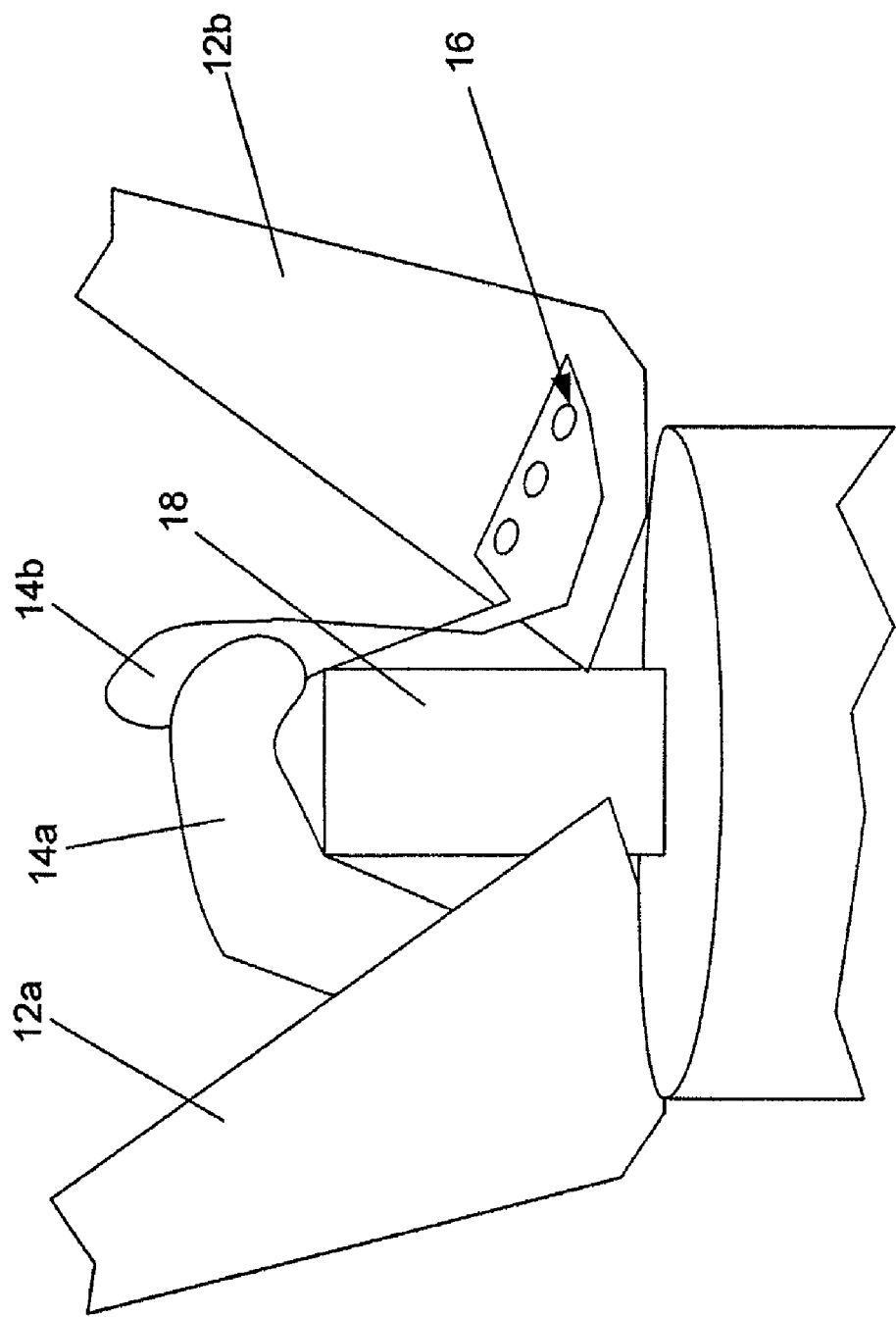
FIG. 5 is a partial perspective view of a protective shield positioned on a launch vehicle illustrating a segmented shroud and respective flexible sheets of material according to one embodiment of the present invention

In an additional embodiment of the present invention, FIG. 5 depicts a shroud having a plurality of segments 12a-b. Thus, the shroud segments 12a-b may be arranged to cooperatively form the shroud, which could be, for example, arranged in a nose cone configuration. The shroud segments 12a-b could be attached to a launch vehicle with bolts, pivots, mechanical latches, or similar devices, as well as other mechanisms known to those skilled in the art. The shroud segments 12a-b could be independent of one another or attached, or otherwise, linked to one another. A plurality of flexible sheets of material 14a-b attach to a respective shroud segment 12a-b. As such, the sheets of material 14a-b may be arranged to at least substantially cover and shield launch vehicle components, such as an optical system 18. The sheets of material 14a-b could be independent of one another, such that the sheets are not attached to one another, or one or more sheets could be attached and, for example, peel away from one another when the segments are deployed. Generally, each sheet of material 14 is attached to the shroud segments 12a-b with a tie 16, such as, for example, rivets that extend through a sheet of material and into a segment.

The shroud segments 12a-b may be pulled away from the launch vehicle sequentially in designated time increments or simultaneously to expose the optical system 18, or any other launch vehicle component, for observation, communication, or subsequent deployment. As the shroud segments 12a-b are pulled away from one another, each segment acts to pull away a respective sheet of material 14a-b. Moreover, one or all of the shroud segments 12a-b and sheets of material 14a-b may be deployed and removed from a launch vehicle.

In the illustrated embodiment, there are two shroud segments 12a-b and two sheets of material 14a-b, however, it is understood that there may be any number of segments and sheets, as well as additional configurations, in further embodiments of the present invention. For instance, there could be five shroud segments 12a-b and respective sheets of material 14a-b, there could be a single sheet of material 14 that attaches to a plurality of shroud segments, there could a plurality of sheets of material attached to a single shroud having no segments, or there could be an odd number of shroud segments and sheets of material (e.g., three shroud segments and two sheets of material).

Figure 3:
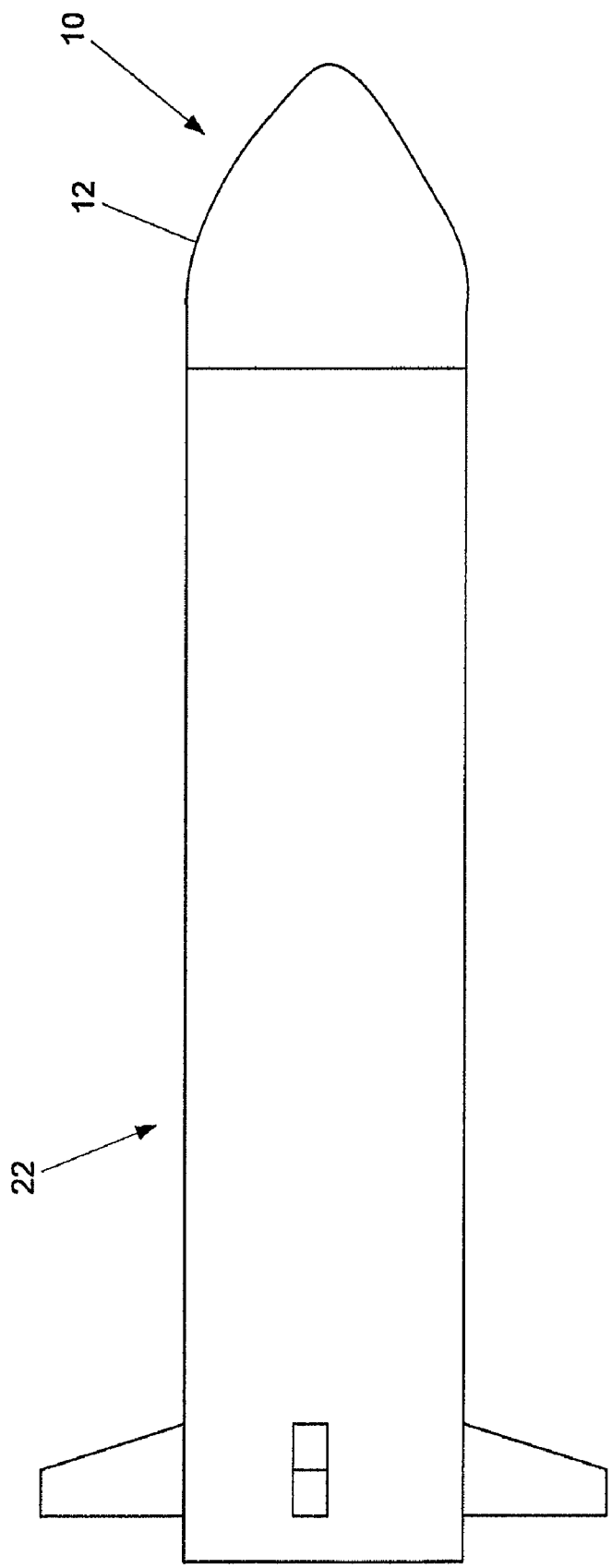
FIG. 3 is plan view illustrating a missile employing a protective shield according to one embodiment of the present invention.

FIG. 3 illustrates the protective shield assembly 10 attached to a missile 22. The missile 22 could be an interceptor or a ballistic missile, as known to those skilled in the art, or any type of rocket capable of utilizing the protective shield assembly 10. Generally, the shroud 12 is removably and circumferentially attached to the missile 22. The technique used to attach the shroud 12 to the missile 22 preferably allows for deployment and removal of the protective shield assembly 10 from the missile at a predetermined time or speed while the missile is airborne. For example, the shroud 12 could be attached to the missile 22 by bolts, mechanical latches, or similar devices, or other devices known to those skilled in the art that may be released, for instance, by electromechanical or explosive mechanisms.

The missile 22 shown in FIG. 3 includes an optical system 18, and in one embodiment of the present invention, the optical system includes an infrared camera. Although the protective shield assembly 10 is discussed herein in conjunction with an optical system 18, it is understood that the protective shield assembly could be utilized to protect any number of launch vehicle components. For instance, the protective shield assembly 10 could be used to protect a payload, guidance system, mission computer/microprocessor, power supply, or other electrical components located in the fore portion of the missile 22, where the accuracy of such components are susceptible to heat, contaminants, and other environmental conditions. Furthermore, it is understood that the launch vehicle may employ any number of optional components, such as a fuel tank, GPS antennas, low band and high band antennas, a flight termination system, beacon, and telemetry, as known to those skilled in the art.

Figure 2C:
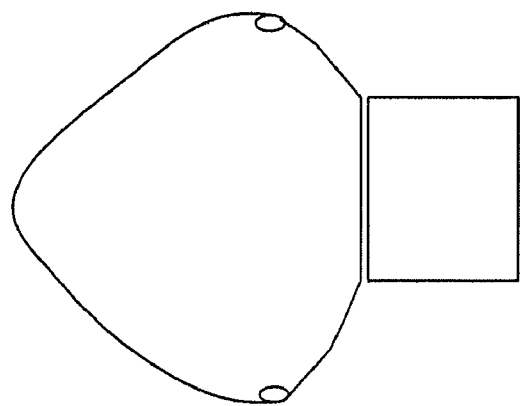
FIG. 2C is a partial cross-sectional view of the protective shield shown in FIG. 2A in a deployed position according to one embodiment of the present invention.
Figure 2B:
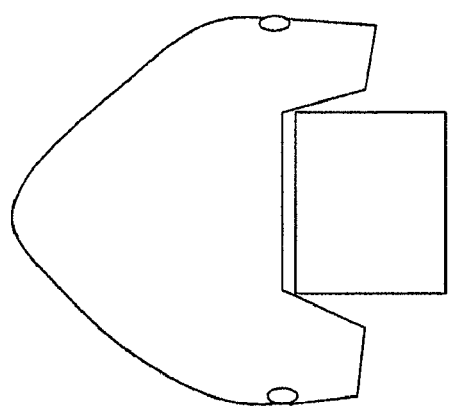
FIG. 2B is a partial cross-sectional view of the protective shield shown in FIG. 2A in a partially deployed position according to one embodiment of the present invention.
Figure 2A:
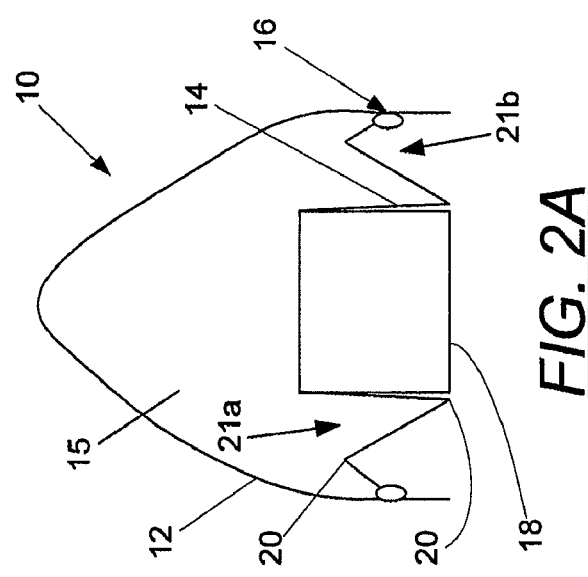
FIG. 2A is a partial cross-sectional view of a protective shield positioned on a launch vehicle according to one embodiment of the present invention.

FIGS. 2A-2C demonstrate the progressive stages of deployment of the protective shield assembly 10 from a launch vehicle. FIG. 2A illustrates the protective shield assembly 10 as it would appear when attached to a launch vehicle, where the flexible sheet of material 14 is substantially conformed about the optical system 18, as also shown in FIG. 3. As the protective shield assembly 10 is initially deployed, as shown in FIG. 2B, the movement of the shroud 12 away from the optical system 18 also causes the flexible sheet of material 14 to pull away from the optical system. When the shroud 12 is completely deployed from the launch vehicle, as depicted in FIG. 2C, the flexible sheet of material 14 is pulled away from the optical system 18 such that the optical system is exposed and fully functional.

The protective shield assembly 10 may be deployed from the launch vehicle using any technique known to those skilled in the art. Although various mechanical techniques may be employed with the present invention, explosives are preferably used to detach the protective shield assembly 10 from the launch vehicle, as there is a lower risk of failure when nonmechanical techniques are utilized. The explosives could be positioned proximate to the attachment of the shroud 12 to the launch vehicle and detonated under the command of a microprocessor within the launch vehicle or from a remotely communicated signal.

Embodiments of the present invention provide many advantages. The flexible sheet of material 14 provides a protective layer that may conform about an optical system disposed within a launch vehicle. Providing a flexible sheet of material enables the material to be configured about a variety of launch vehicle components to provide a barrier against heat and contaminants that may otherwise sacrifice the accuracy of the components, such as an optical system. Thus, the incidence of a lower signal-to-noise ratio and blurring due to warped optics may be significantly reduced.

Furthermore, the flexible sheet of material 14 may be an inexpensive material, such as polyester, and may be readily attached to the interior surface of the shroud 12. Upon deployment of the shroud 12, the flexible sheet of material 14 is also removed from the launch vehicle, which provides additional protection for the launch vehicle components without affecting the ability of shroud to be deployed from the launch vehicle. Finally, because the flexible sheet of material 14 has a broad area of attachment substantially about the circumference of the shroud 12, the risk of failure during deployment is greatly reduced when compared with mechanical devices having a single or very few areas of attachment and/or including techniques that have a higher risk of failure during deployment of the shroud.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for deploying a protective shield assembly from a launch vehicle comprising:
   providing a launch vehicle including a shroud having a flexible sheet of material coupled thereto such that the flexible sheet of material substantially conforms to a contour of at least a portion of the launch vehicle to provide a protective barrier; and
   deploying the shroud from the launch vehicle such that the flexible sheet of material is removed from the launch vehicle.

2. The method according to claim 1, wherein deploying comprises deploying the shroud from the launch vehicle to remove the flexible sheet of material such that an optical system disposed within the launch vehicle is exposed.

3. The method according to claim 2, wherein deploying comprises igniting an explosive device to release the shroud and the flexible sheet of material from the launch vehicle.

4. The method according to claim 1, wherein providing comprises providing a launch vehicle including a shroud having a flexible sheet of material attached thereto such that a pocket is defined between the flexible sheet and the shroud and the flexible sheet of material conforms to a contour of at least a portion of the launch vehicle independently of the shroud to provide a protective barrier.

5. A system for deploying a protective shield assembly from a launch vehicle comprising:
   a launch vehicle; and
   a protective shield assembly attached to the launch vehicle, the protective shield assembly comprising:
      a shroud configured to be deployed from the launch vehicle; and
      a flexible sheet of material coupled to the shroud, the flexible sheet of material capable of substantially conforming to a contour of at least a portion of the launch vehicle to provide a protective barrier, wherein the flexible sheet is removed from the launch vehicle when the shroud is deployed from the launch vehicle.

6. The system according to claim 5, wherein the flexible sheet of material comprises a thermally insulating material.

7. The system according to claim 6, wherein the flexible sheet of material comprises a multilayer insulation material.

8. The system according to claim 7, wherein the multilayer insulation material comprises a polyester film.

9. The system according to claim 8, wherein the polyester film includes a reflective metallic coating comprising one of gold and aluminum.

10. The system according to claim 5, wherein the flexible sheet of material attaches circumferentially to the shroud to define a pocket between the shroud and the flexible sheet of material.

11. The system according to claim 5, wherein the launch vehicle comprises a missile having an optical system disposed within the missile, and wherein the flexible sheet of material conforms to a contour of the optical system and is capable of providing a protective barrier for the optical system from heat and contaminants.

12. The system according to claim 11, wherein the flexible sheet of material defines at least one fold between the shroud and the optical system, the fold capable of substantially conforming circumferentially about the optical system.

13. The system according to claim 5, wherein the shroud comprises a plurality of segments.

14. The system according to claim 5, herein the flexible sheet of material comprises a plurality of sheets of material, and wherein each sheet of material attaches to a respective segment.

15. The system according to claim 5, wherein at least one of the flexible sheet of material or the shroud is configured to be removably attached to the launch vehicle.

16. The system according to claim 5, wherein the flexible sheet of material is attached to the shroud so as to define a pocket between the flexible sheet and the shroud, wherein at least a portion of the flexible sheet of material is attached to the shroud so as to be capable of conforming to a contour of the launch vehicle independently of the shroud to provide a protective barrier.

17. The system according to claim 16, wherein the pocket between the flexible sheet and shroud is defined substantially along a length of the flexible sheet.

* * * * *